UNITED STATES PATENT OFFICE.

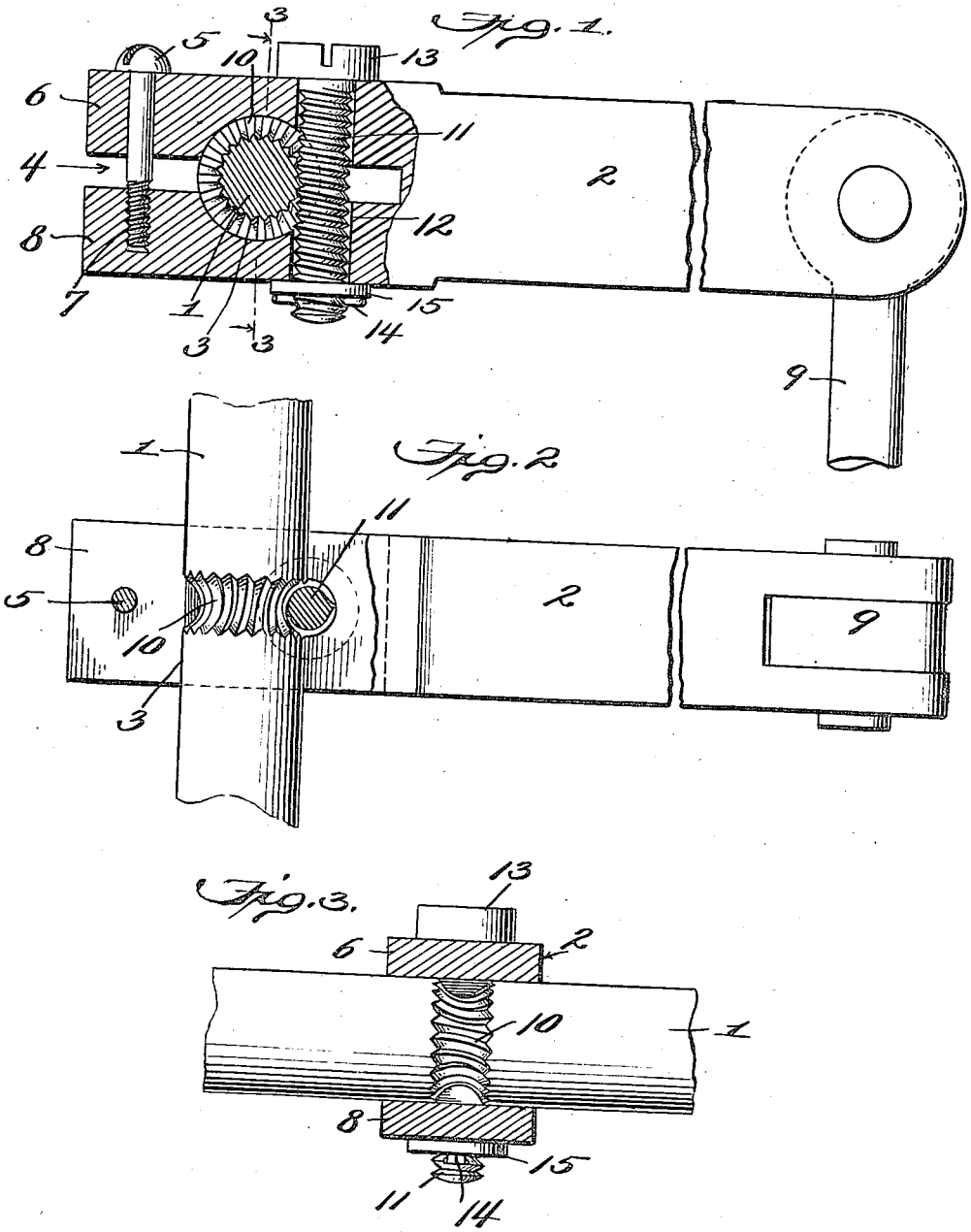

LOUIS GREINER COLLYER, OF UPPER MONTCLAIR, NEW JERSEY, ASSIGNOR TO THE AEOLIAN COMPANY, A CORPORATION OF CONNECTICUT.

ADJUSTABLE CONNECTION FOR ACTUATING ARMS.

1,421,408.  Specification of Letters Patent.  Patented July 4, 1922.

Application filed March 27, 1919. Serial No. 285,509.

*To all whom it may concern:*

Be it known that I, LOUIS GREINER COLLYER, a citizen of the United States, residing at Upper Montclair, New Jersey, have invented certain new and useful Improvements in Adjustable Connections for Actuating Arms, of which the following is a specification.

The present invention relates to means for mechanically connecting an operating arm or crank to a shaft or similar element, whereby the latter may be rotated or adjusted by swinging movement imparted to the arm or crank.

The primary object of the invention is to provide a novel and improved connection of this character which is capable of being adjusted with facility to vary the angular relation between the arm or crank and the shaft or analogous element, even though the degree of adjustment required may be relatively slight, and when so adjusted, it will positively hold or lock the arm or crank in fixed angular relation to the shaft.

Other objects of the invention are to provide a mechanical connection of this character which is capable of adjustment without requiring relative separation of the parts and which is compact and may be made inexpensively.

To these and other ends, the invention consists in certain improvements and combinations and arrangements of parts, all as will be hereinafter described, the features of novelty being pointed out particularly in the claims at the end of the specification.

In the drawings—

Figure 1 is a view partly in elevation and partly in section, illustrating an adjustable connection constructed in accordance with the preferred embodiment of the invention.

Figure 2 is a view partly in top plan of Figure 1, and partly in section, and

Figure 3 represents a section through the connection taken on the line 3—3, Figure 1, and looking in the direction of the arrows, the shaft being shown in elevation.

Similar parts are designated by the same reference characters in the different views.

The present invention provides a mechanical connection which may be used generally in connection with various mechanisms where it is desirable or necessary to connect an actuating arm or crank to a shaft or equivalent part, the connection enabling the angular relation between the arm or crank and the shaft to be varied easily and quickly, although the arm or crank will be locked or firmly fixed in its various adjusted positions. The preferred embodiment of the invention is shown in the accompanying drawing and will be hereinafter described in detail, but it is to be understood that the invention is not restricted to the precise construction shown, as equivalent constructions are contemplated and will be included within the scope of the claims.

In the present instance, 1 represents a portion of the shaft or analogous element and 2 represents the arm or crank to be adjustably fixed thereon. The part of the shaft or equivalent element which is engaged by the arm or crank is preferably of cylindrical form and the arm or crank is formed with a bore or opening 3 which is of correspondingly cylindrical form to fit the shaft. The end of the arm or crank having the bore or aperture 3 is preferably split by a slot 4 which extends inwardly from the adjacent end of the arm into the bore 3, this split construction enabling the arm or crank to be easily slipped over one end of the shaft and moved longitudinally into the desired position thereon. Clamping means is preferably employed to produce a snug fit of the arm or crank on the shaft, the clamping means shown comprising a screw 5 which extends loosely and rotatably through one of the split halves 6 of the arm and is threaded in a tapped hole 7 formed in the other split half 8. Swinging motion may be imparted to the arm or crank 2 by a rod 9 pivoted or otherwise attached to the arm at or toward its free end. Where motion is imparted from the shaft to the arm or crank, the swinging motion of the crank will then be transmitted to the rod 9 and such motion may be utilized for the actuation or adjustment of some mechanism or part.

The shaft and the arm or crank are adjustably locked in any desired angular relation by worm wheel teeth 10 on the shaft and a cooperating worm 11 carried by the arm or crank. Preferably, and as shown, the worm wheel teeth 10 are formed in a groove which extends around the shaft, and the worm 11 which meshes with the worm wheel teeth is preferably in the form of a screw which extends rotatably through a bore 12, this bore extending entirely through the arm or crank. The screw is provided with a head 13 which lies against one side of the crank or arm and may be slotted or otherwise formed to receive a suitable tool for adjusting it, and the opposite end of the screw projects from the opposite side of the arm or crank and is provided with suitable means for sustaining end thrust thereon, it being provided in the present instance, with a cotter pin 14 and a washer 15 between the cotter pin and the adjacent side of the arm or crank. In any case the screw or rotatable member having the thread or worm 11 thereon is rotatable in its bore in the arm or crank and is held from axial movement in the arm or crank and the screw or worm is in constant mesh with the worm wheel teeth or the spiral thread formed in the shaft.

In the embodiment of the invention shown, the arm or crank is applied to the shaft by removing the worm or screw 11 from the arm or crank and loosening the screw 5, the arm or crank may then be slipped axially upon one end of the shaft until the bore 12 in the arm or crank is in the plane with the worm wheel teeth 10. The worm or screw 11 is then introduced into the bore 12, it being brought into its proper position, for example, by rotating it after which the washer and cotter pin are applied. The clamping screw 5 may then be tightened more or less and the arm or crank may be brought into its desired angular relation to the shaft by rotation of the screw or worm 11, the reaction between the rotating screw or worm on the arm and the worm wheel teeth on the shaft resulting in a rotation of the arm about the shaft. Obviously the arm or crank may be adjusted in either direction about the shaft as an axis by rotating the worm or screw in the appropriate direction. After the arm or crank has been adjusted, the clamping screw 5 may be tightened to cause the split end of the arm or crank to bind upon the shaft, thus locking the parts in adjusted position. This construction enables the angular relation between the arm or crank and the shaft to be varied from time to time as conditions may require, it only being necessary to slightly loosen the screw 5 (if the screw has been tightened sufficiently to lock the parts in a previously adjusted position) and to rotate the worm or screw in the proper direction and to the proper extent. The cooperating worm wheel teeth on the shaft and the worm carried by the arm will form at all times a lock to prevent alteration in the angular relation between the arm and the shaft, due to turning forces acting either on the shaft or the arm or crank, as such forces can not overcome the frictional resistance produced between the worm wheel teeth and the worm, due to the pitch of the worm, the worm being preferably of the single thread type, to which frictional resistance is added the frictional resistance offered to the turning of the worm and a fine adjustment between the arm or crank and the shaft may be maintained by tightening the clamping screw 5.

The splitting of the shaft receiving end of the arm or crank may, in some cases, be dispensed with, but it is preferably provided as it facilitates the application of the arm or crank to the shaft, and it also insures a snug fit of the arm or crank on the shaft, as the clamp enables all side play or other looseness to be taken up, especially in those instances where the shaft and the arm are not fitted with exactness. Furthermore, the clamp insures a close meshing of the teeth of the worm and the worm wheel, as it will be observed that tightening of the clamping screw 5 acts to draw the worm toward and into closer mesh with the worm wheel.

I claim as my invention:—

1. Means for adjusting and locking an arm or crank in different angular relations to a rotatable element, comprising an element provided with an annular series of worm-wheel teeth, an arm or crank having a bore in which said element rotatably fits and carrying a worm which is rotatable but non-shiftable axially therein and meshes with the worm-wheel teeth on said element and means operative independently of the worm to lock said element and arm in different adjusted relations.

2. The combination of an element formed with a cylindrical portion and worm-wheel teeth adjacent thereto, an arm having a bore to rotatably fit the cylindrical portion of said element, a worm rotatably fitted in said arm and meshed with the worm-wheel teeth in said element, said worm being non-shiftable axially relatively to said arm, and means independent of the worm for clamping the arm on the cylindrical portion of said element.

3. The combination of an element formed with a peripheral groove and an annular series of worm-wheel teeth contained in said groove, an arm having a clamping portion rotatably fitted on said element, a worm rotatably fitted to said arm and meshing with the worm-wheel teeth on said element, said worm being non-shiftable axially relatively to said arm, and means operative independently of the worm for producing a clamping action between the clamping portion of said arm and said element.

4. The combination of a shaft having a cylindrical portion formed with a peripheral groove and worm-wheel teeth in said groove, an arm having a split portion fitted to the cylindrical portion of the shaft, a worm rotatably fitted in said arm and meshing with the worm-wheel teeth in the groove in the shaft, and means acting independently of the worm for clamping the split portion of the arm upon the shaft.

5. The combination of a shaft having peripherally arranged worm-wheel teeth formed thereon, an arm having a split end to fit on said shaft and provided with means toward its split end and at one side of the shaft for clamping the arm in position on the shaft, and a worm rotatably fitted in said arm at the opposite side of said shaft and meshing with the worm-wheel teeth on the shaft.

In testimony whereof, I have signed my name to this specification, this 21st day of March, 1919.

LOUIS GREINER COLLYER.